(12) United States Patent
Nielson et al.

(10) Patent No.: US 6,331,840 B1
(45) Date of Patent: Dec. 18, 2001

(54) OBJECT-DRAG CONTINUITY BETWEEN DISCONTINUOUS TOUCH SCREENS OF A SINGLE VIRTUAL DESKTOP

(76) Inventors: Kevin W. Nielson, 4007-5$^{th}$ St S.W., Calgary, AB (CA), T2S 2C9; Husam Kinawi, #903, 2010 Ulster Rd. N.W., Calgary, AB (CA), T2N 4C2

( * ) Notice: Subject to any disclaimer, the term of this patent is extended or adjusted under 35 U.S.C. 154(b) by 0 days.

(21) Appl. No.: 09/277,204

(22) Filed: Mar. 26, 1999

(30) Foreign Application Priority Data

Mar. 27, 1998 (CA) .................................................. 2233497

(51) Int. Cl.$^7$ ....................................................... G09G 3/02
(52) U.S. Cl. .......................... 345/1.1; 345/700; 345/733; 345/764; 345/769
(58) Field of Search ............................. 345/1, 326, 329, 345/339, 1.1, 700, 733, 764, 769

(56) References Cited

U.S. PATENT DOCUMENTS

| | | | |
|---|---|---|---|
| 5,327,161 | * 7/1994 | Logan et al. ......................... | 345/157 |
| 5,585,821 | * 12/1996 | Ishikura et al. ....................... | 345/145 |
| 6,084,553 | * 7/2000 | Walls et al. ............................... | 345/1 |

* cited by examiner

*Primary Examiner*—Bipin Shalwala
*Assistant Examiner*—Vincent E. Kovalick
(74) *Attorney, Agent, or Firm*—Sean W. Goodwin

(57) ABSTRACT

Apparatus and process are provided wherein an object can be manipulated between multiple discontinuous screens which form a single continuous virtual display. Each screen is touch or input sensitive to a pointing implement or device, and a physical discontinuity separates each of the screens from the others, this continuity being non-touch sensitive. First, a pointing implement contacts the source touch-screen to select the object, storing parameters in the computers buffer. The pointing implement is moved to the target touch-screen where the pointing implement contacts where the first object is to be dragged to; then the object is released from the buffer so that the first object is pasted to the target touch-screen. Preferably, when the object is touched at the source screen, a timer starts, and if the target screen is touched before timeout, the object appears at the target. Optionally, displayed second and third objects a context menu, or buttons on a wireless stylus can be invoked to specify cut, copy and paste functions.

14 Claims, 5 Drawing Sheets

Flowchart for Operating System Shell Extension to Support Touch Screen Multiple Displays Flowchart for Wireless Stylus to Support Touch Screen Multiple Displays

OBJECT-DRAG CONTINUITY BETWEEN DISCONTINUOUS TOUCH SCREENS OF A SINGLE VIRTUAL DESKTOP

FIELD OF THE INVENTION

The present invention relates to apparatus and process for manipulating displayed objects between touch screens where there is a physical discontinuity between the touch screens.

BACKGROUND OF THE INVENTION

Personal Digital Assistants (PDA) are microprocessor-based computers that emphasise their small size and personal information management capabilities. Conventional PDAs utilise a single screen. The PDA screen surfaces are touch sensitive to permit input functions. One screen is usually provided, the small size of which results in a limited input and output-working surface. Multiple screens can increase the user's effective, or virtual, screen real estate.

Electronic books are known to provide multiple screens (U.S. Pat. No. 5,534,888 to Lebby et al., U.S. Pat. No. 5,467,102 to Kuno et al., and U.S. Pat. No. 5,239,665 to Tsuchiya). Multiple screens are known which can display a single virtual (or linked) image (Kuno). In U.S. Pat. No. 5,579,481 to Drerup, networked computers use a wireless stylus and standard CRT screens to enable files to be moved from one networked computer to the other through application of the stylus to the screen. The stylus has an identifier and when applied to screen A, the selected file is associated with the unique ID of the stylus. Later, if the stylus is applied to a second screen B, the computer for screen B recognizes the ID of the stylus, remembers the file associated with it and then retrieves the file through the network from the computer associated with screen A.

Note however, that this approach to maintaining continuity is not feasible for Personal Digital Assistants that have more than one touch screen.

As described in greater detail below, known input devices include touch screens, touchpads and digitizers. All use basically the same grid construction to sense the co-ordinates of the user's input through a pointing device, be it a stylus or fingertip.

Touch screen displays have been introduced and widely used due to their intuitive interface and low-cost. Computers with touch-screen displays regard the operator's fingers or a hand-held stylus as the pointing device that manipulates the display's surface.

Computers with multi-displays are known where the nature of the application requires greater screen real estate (e.g., CAD applications) or the ability to have multiple entry points (e.g., machine-code debuggers). Typically these computers use standard pointing devices like a mouse or a digitizer for input.

Standard pointing devices utilize a flat, continuous surface which software maps to the displays' real estate. Through software, the displays are mapped either to a single virtual desktop or to multiple desktops. The pointing device moves continuously through the entire virtual desktop.

Where multiple displays underlie a discontinuous -display surface, through the pointing device, users can drag, transfer and manipulate objects across the multiple displays because the pointing device itself never crosses a discontinuity in the input surface.

Computers with multi-displays that employ touch screen technology will have the displays' surfaces functioning as the 'pointing device surfaces'. There is a complexity in building intuitive user interfaces if the displays were mapped to a single virtual desktop and the user needs to move and manipulate objects across the multiple displays. This complexity results from the fact that there is a physical discontinuity in the 'pointing device surfaces'.

Multiple screens, which are capable of displaying a single virtual image, and which also will allow touch-screen input, are not known to the applicants. This is further complicated in the situation where, in graphical user interfaces (GUI), it is common to select an object (e.g. an icon representing a file, a text or graphic clip, etc.) and drag it to a specific location on the screen (e.g. a "trashbin" icon for deleting the file). With a single, continuous screen, which doubles as an input surface, a user may easily identify or select the object by touching it with a pointing implement or device. Then in a continuous movement the user may drag the object across the surface of the display (maintaining contact between screen and the pointing device) and release the object once there for whatever purpose. However, as stated, with multiple screens, there is necessarily a physical discontinuity therebetween. Thus, one cannot maintain this continuous movement of the stylus without losing contact between the screen and stylus and accordingly lose the object when crossing the discontinuity.

SUMMARY OF THE INVENTION

Apparatus and process are provided wherein an object can be manipulated between multiple discontinuous screens. Each screen is touch or input sensitive to a pointing implement or device, and a physical discontinuity separates each of the screens from the others, this discontinuity being non-touch sensitive.

Broadly, the process comprises:
selecting a first object on a first source screen with the pointing device or stylus. Parameters defining the object are stored in an internal buffer so that it is removed or copied from the source screen, either by
  i. starting a timer upon selecting the first object, automatically storing the first object, or
  ii. continuously touching the 'left' button of a wireless stylus; or by
  iii. selecting an object "cut/copy" function through selection of a displayed second object through software, or through touching the screen in a specific operating system recognized gesture or through application of a hardware button; then
moving the pointing implement across the discontinuity, from the source screen to the target screen; and then
releasing the first object from the internal buffer so that the first object appears on the target screen either by
  i. contacting the target screen with the stylus before the timer expires, reaching its pre-determined timeout; or
  ii. when the 'left' button of the wireless stylus is released with the stylus touching the target screen; or
  iii. placing the stylus in contact with the target screen and an selecting an object "paste" either by selecting a displayed third object, through touching the screen in a specific 'operating system recognized gesture', or clicking the wireless stylus' right button and choosing 'paste' from the context menu that appears).

DETAILED DESCRIPTION OF THE PREFERRED EMBODIMENT OF THE INVENTION

Figure 1:
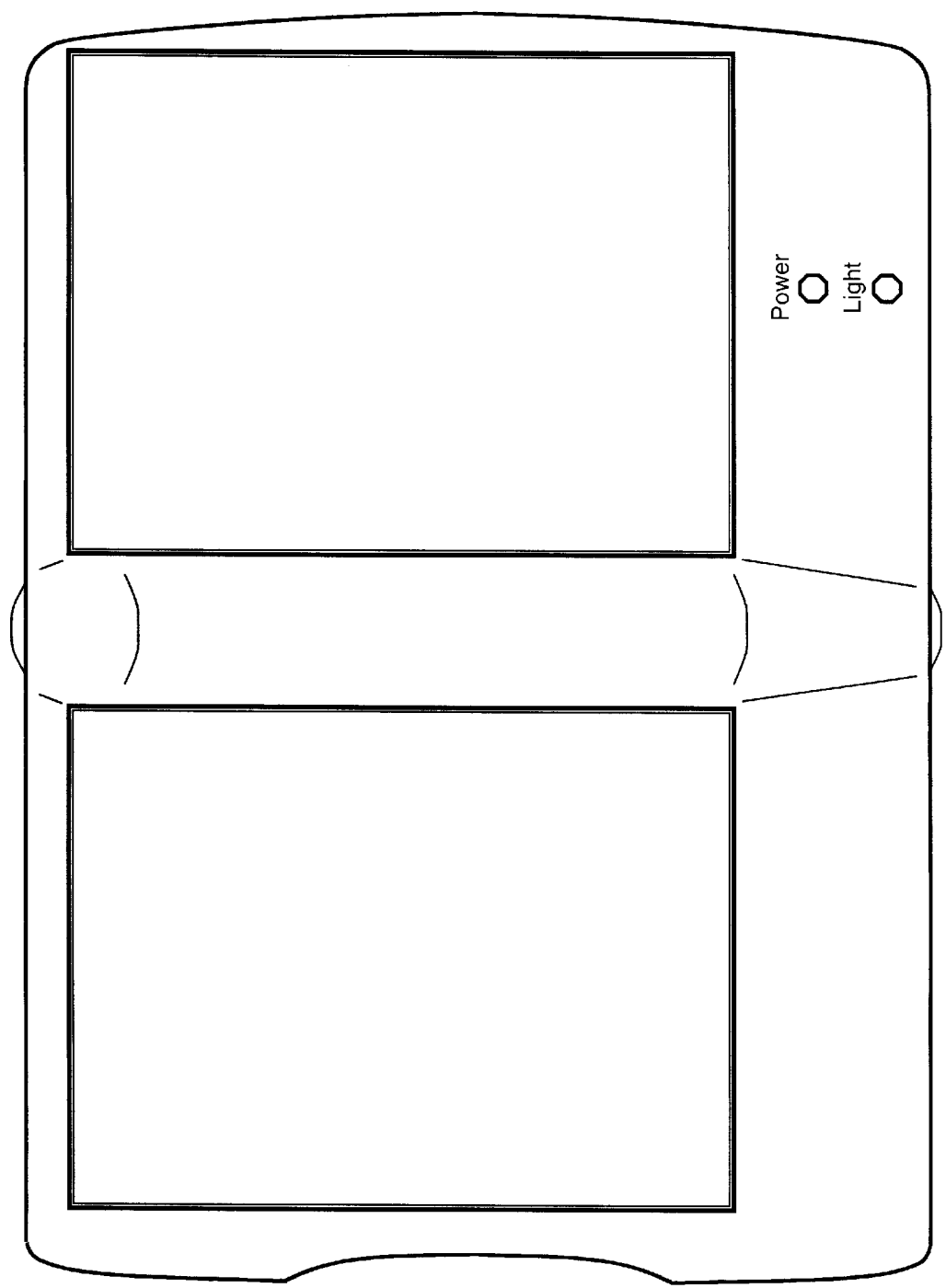
FIG. 1 is a plan view of PDA having two touch-screens opened and having a discontinuity (hinge) therebetween.
Figure 2:
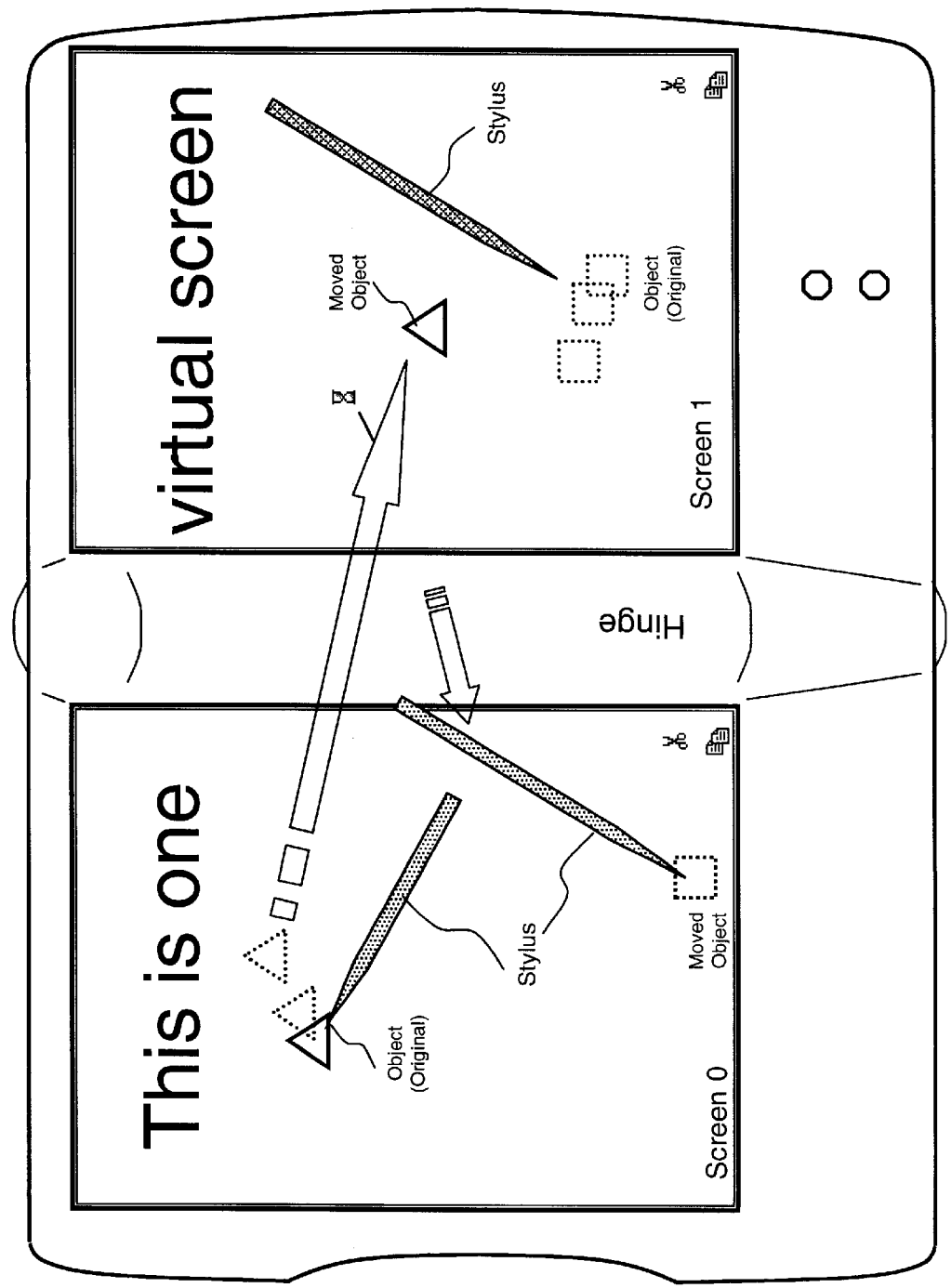
FIG. 2 is a diagrammatic view of the PDA according to FIG. 1, showing two screens displaying a single virtual desktop and a pointing device or stylus dragging an triangular object across the intermediate discontinuity, this action being impossible without the process disclosed herein.
Figure 3:
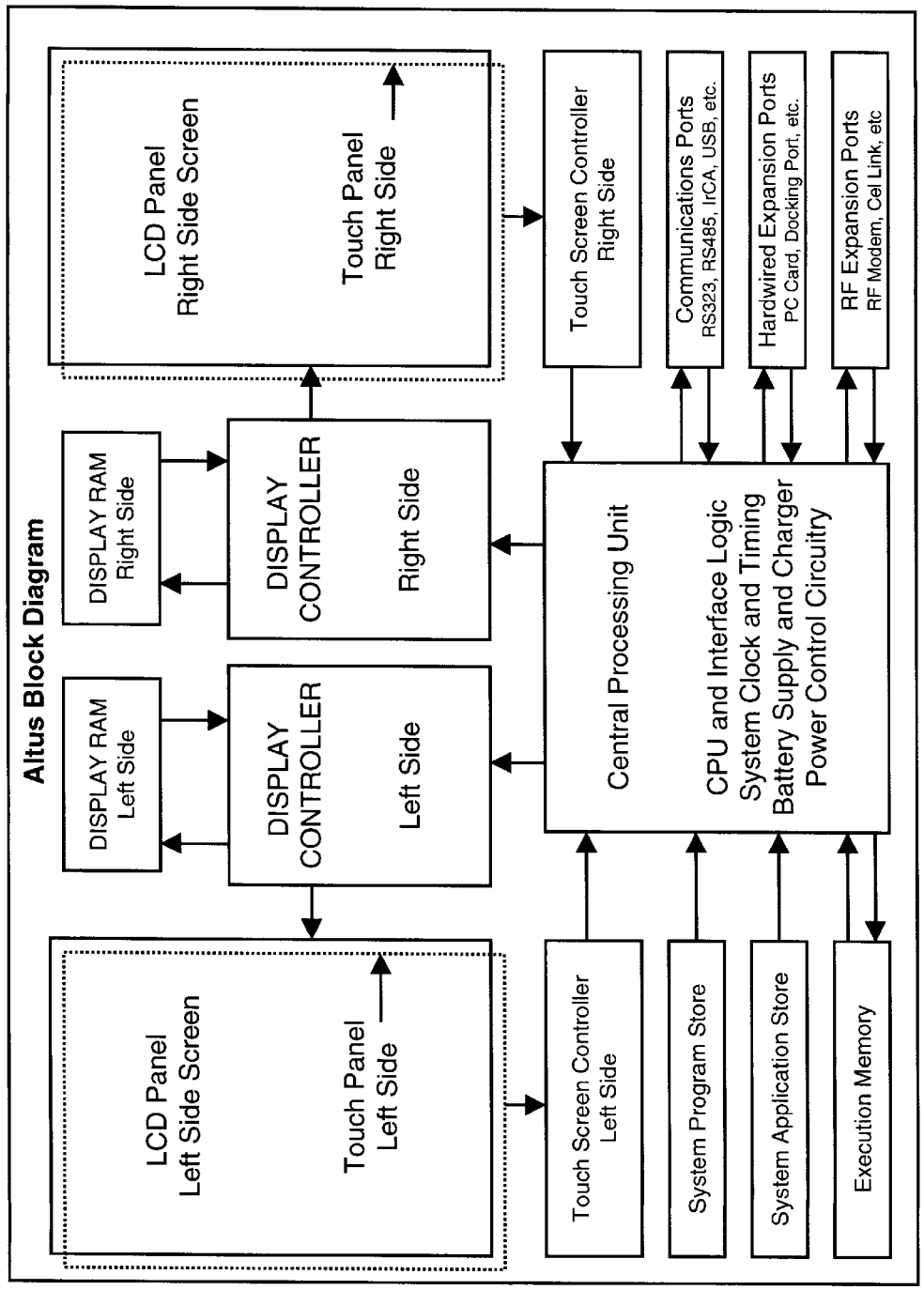
FIG. 3 is a block-flow diagram of the individual components of a dual screen PDA.

Two preferred solutions are provided to compensate and overcome the difficulties associated with a two or more physically discontinuous 'pointing device surfaces'. As shown in FIGS. 1,2 and 3, the two screens of a PDA are also touch-screens. The dual screens display either two parts of one virtual screen or two separate parts. The point being that at some time, a user will desire to move an object from one screen to another.

It is understood that moving, cutting, and pasting are the colloquial terms for a background process performed by the operating system. For example, a drag operation is akin to cutting from one location and a paste operation to another location. While the object seems to have been deleted from its former location, the objects parameters, know by the computer, and which describe that unique object, have merely been updated as to the objects coordinates. The object has not really been deleted.

Having reference to FIG. 3, the computer comprises a CPU, communication interfaces, expansion ports, ROM and RAM. The CPU interfaces display controller, two shown—one for output to each of the two screens or displays. Each display controller has its own display RAM and interfaces with an LCD display panel. The CPU and the display controllers directs which of the two screens displays which part of the virtual screen. Two touch screen controllers relay input to the CPU.

The first embodiment, which is software-based solution, is an extension to an operating system shell. The second solution is hardware-based comprising a two or three-buttoned wireless stylus.

Figure 4:
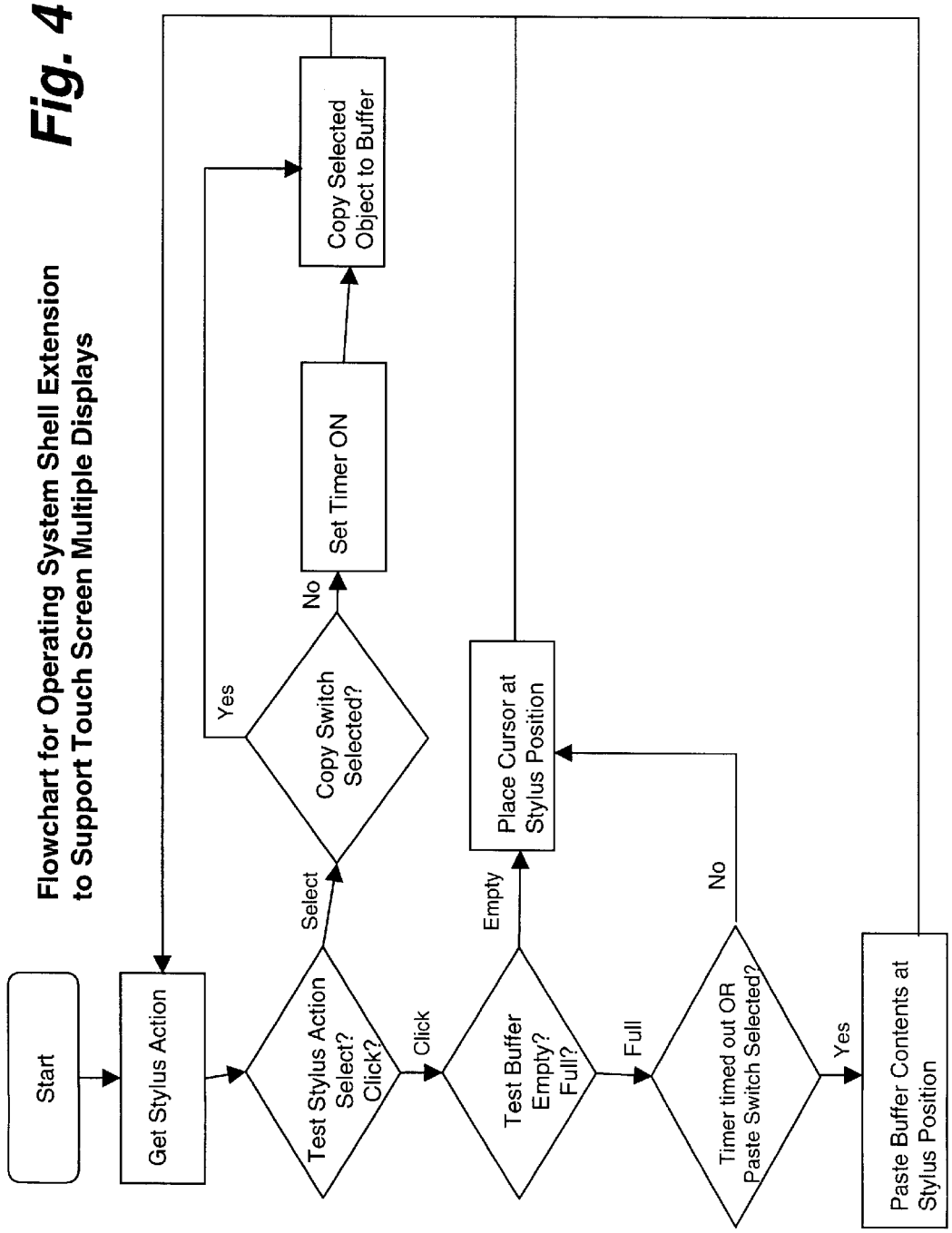
FIG. 4 is a flow chart of the software implementation of the dual-screen continuity solution according to the first embodiment.

Having reference to FIG. 4, in the first embodiment, an operating system shell extension is provided to enhance a typical operating system (such as Windows CE, available from Microsoft Corporation) to support multiple touch screen displays.

The operating system shell extensions that would support touch screen multiple displays are:
  state-saving: this will save the state information of where the stylus last touched one of the displays; and
  timer: this will store the last time the stylus touched the displays.

The screens will have known screen identifiers, such as screen 0 (the source screen) and screen 1 (the target screen) or vice-versa.

The operating system shell extensions will solve the problem of having a physically discontinuous pointing device surface (FIG. 2) in the following operations:
  Drag and Drop of Objects
    By tapping a pointing device on the surface of a touch screen (FIG. 2), the user can highlight and select an object. Once selected, the user can move the selected object by touching the surface of the target screen within a certain timeout.
  Cut/Copy and Paste
    By tapping a pointing device on the surface of a touch screen, the user can highlight and select an object. Once selected, the user can cut/copy the selected object to an internal buffer (e.g., an operating system clipboard). One approach is by touching a 'cut/copy' icon (for example, as shown on FIG. 2—scissors icon for cut and dual pages icon for copy). Another approach is to scribe a specific operating system recognized scripted gesture. The user can then paste the selected object by touching the surface of the target screen at the desired location and then touching a 'paste' icon or scribing a paste gesture.

Figure 5:
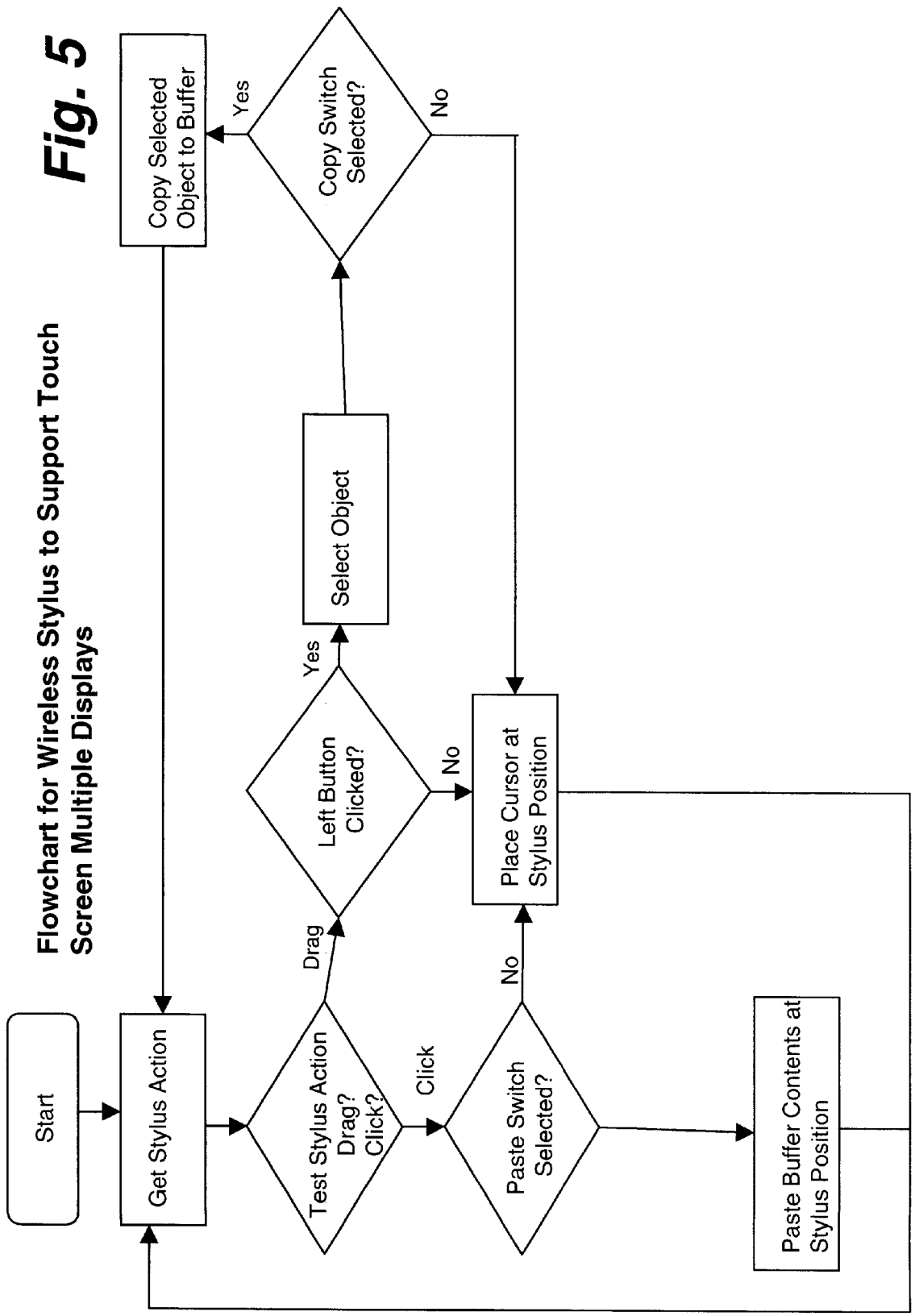
FIG. 5 is a flow chart of the wireless stylus—hardware implementation of the dual-screen continuity solution according to the second embodiment.

Having reference to FIG. 5, in a second embodiment, a two or three-buttoned wireless stylus acts as a 'pointing device' which sends its state information using wireless transmission (i.e. radio waves, or ultrasonics) to the PDA computer.

The 'left' button of the device is used for all 'select' operations; the 'middle' button (absent in the two buttoned stylus) is used for fast navigation within an open document; while the 'right' button is used to invoke 'context' menus. It will solve the problem of having a physically discontinuous pointing device surface in the following operations:
  Drag and Drop of Objects
    By tapping the wireless stylus on the surface of a touch screen while pressing on the 'left' button, the user can highlight and select an object. Once selected, the user can move the selected object by touching the highlighted object, pressing the 'left' button, touching the surface of the target screen at the desired location, and then releasing the 'left' button.
  Cut/Copy and Paste
    By tapping a wireless stylus on the surface of a touch screen while pressing on the 'left' button, the user can highlight and select an object. Once selected, the user can cut/copy the selected object to the internal buffer by pressing down the 'right' menu button and selecting the 'cut/copy' option from the 'context' menu that is displayed. Conveniently the menu appears adjacent to the stylus although it could appear anywhere on the desktop. The user can then paste the selected object by touching the surface of the target screen at the desired location, pressing down the 'right' button and selecting the 'paste' option from the 'context' menu.

Simply then, the process comprises:
a. providing multiple screens upon which is presented a continuous virtual display, wherein
  i. each screen is touch or input sensitive to a pointing implement or device, and
  ii. a physical discontinuity separates each of the screens from the others, this continuity being non-touch sensitive;
b. selecting a first object on a source screen with the stylus (this selection necessarily including some kind of object ID, its coordinates and an action tag which specifies the kind of selection);
c. storing the first object in an internal buffer so that it is removed or copied from the source screen, either by
  i. starting a timer upon selecting the first object, automatically storing the first object, or
  ii. continuously touching the 'left' button of the wireless stylus; or
  iii. selecting an object "cut/copy" function through selection of a displayed second object through software, or through touching the screens in a specific operating system recognized gesture or through application of a hardware button;
d. moving the stylus across the discontinuity, from the source screen to a target screen; and
e. releasing the first object from the internal buffer so that the first object appears on the target screen either by iv. contacting the target screen with the stylus before the timer expires, reaching its pre-determined timeout; or v. expires or when the 'left' button of the wireless stylus is released the target screen; OR vi. placing the stylus in contact with the target screen and an selecting an object "paste" either by selecting a displayed third object, through touching the screen in a specific 'operating system recognized gesture', or clicking the wireless stylus' right button and choosing 'paste' from the context menu that appears).

The embodiments of the invention in which an exclusive property or privilege is claimed are defined as follows:

1. A process for dragging a displayed first object between discontinuous source and target touch-screens of the single virtual desktop of a computer, the first object being known in the virtual desktop by unique parameters, the process comprising:

contacting a pointing implement to the source touch-screen to select the first object;

storing the selected first object's parameters in a buffer in the computer;

moving the pointing implement to the target touch-screen;

contacting the pointing implement to the target touch-screen where the first object is to be dragged to;

releasing the selected first object's parameters from the buffer so that the first object is pasted to the target touch-screen.

2. The process as recited in claim 1 further comprising:

initiating a timer upon selecting of the first object, the timer having a predetermined timeout; and contacting the pointing implement to the target touch-screen wherein, if contacted before the timer reaches timeout, the selected first object's parameters are released from the buffer so that the first object is pasted to the target touch-screen.

3. The process as recited in claim 2 wherein the first object is moved to the target screen further comprising:

deleting the selected first object from the source screen if the first object is pasted to the target touch-screen.

4. The process as recited in claim 3 wherein the first object's parameters comprise at least a unique first object identifier on the virtual desktop.

5. The process as recited in claim 3 wherein the first object parameters comprise at least a unique first object identifier, the first object's coordinates on the virtual desktop, and whether the first object's association with the source touch-screen is to be deleted after dragging or to remain as a copy of the first object.

6. The process as recited in claim 1 further comprising:

contacting the pointing implement to the source or target touch-screen to select a displayed second object for initiating the storing of the selected first object's parameters in the buffer;

contacting the pointing implement on the target touch-screen at a paste point where the first object is to be dragged to; and contacting the pointing implement to the source or target touch-screen to select a displayed third object for initiating release of the first object's parameters from the buffer so that the first object is pasted to the target touch-screen at the paste point.

7. The process as recited in claim 6 wherein the second object is identified as a copy function and upon selecting the displayed third object, the first object's parameters are released from the buffer so that the first object is pasted to the target touch-screen at the paste point and the first object also remains as a copy on the source touch-screen.

8. The process as recited in claim 6 wherein the second object is identified as a cut function and upon selecting the displayed third object, the first object's parameters are released from the buffer so that the first object is pasted to the target touch-screen at the paste point and the first object is deleted from the source touch-screen.

9. The process as recited in claim 1 further comprising:

contacting the pointing implement to the source touch-screen to select the first object;

actuating a button on the pointing implement for initiating the storing of the first object's parameters in the buffer;

contacting the pointing implement on the target touch-screen at a paste point where the first object is to be dragged to; and actuating the button for initiating the releasing of the first object's parameters from the buffer so that the first object is pasted to the target touch-screen at the paste point.

10. The process as recited in claim 1 wherein the pointing implement is a stylus in wireless communication with the computer.

11. The process as recited in claim 1 further comprising:

contacting the pointing implement to the source touch-screen at the first object;

actuating a first button on the pointing implement for selecting the first object;

actuating a second button on the pointing implement for displaying a context menu on either of the touch-screens;

contacting the touch-screen displaying the context menu for selecting a first function from the menu for initiating the storing of the first object's parameters in the buffer;

contacting the pointing implement on the target touch-screen at a paste point where the first object is to be dragged to;

actuating the second button on the pointing implement for displaying the context menu; and contacting the touch-screen for selecting a second function from the menu for initiating the releasing of the first object's parameters from the buffer so that the first object is pasted to the target touch-screen at the paste point.

12. The process as recited in claim 11 wherein the first function from the context menu is a copy function so that when the first object is pasted to the target touch-screen at the paste point, the first object also remains on the source touch-screen.

13. The process as recited in claim 11 wherein the first function from the context menu is a cut function so that when the first object is pasted to the target touch-screen at the paste point, the first object is deleted from the source touch-screen.

14. A process for dragging a displayed object between discontinuous source and target touch-screens of a single virtual desktop comprising:

providing a timer having a pre-determined timeout;

selecting an object from the source touch-screen using a pointing implement;

initiating the timer upon selecting of the object; and contacting the pointing implement to the target touch-screen at a paste point where the object is to be dragged to and if contacted before the timer reaches timeout, the object pasted to the target touch-screen at the past point.

* * * * *